United States Patent
Grabovac

Patent Number: 5,751,586
Date of Patent: May 12, 1998

[54] CNC MACHINE TOOL

[76] Inventor: Bosko Grabovac, 1114 Fairview Ave., Arcadia, Calif. 91748

[21] Appl. No.: 565,789

[22] Filed: Dec. 1, 1995

[51] Int. Cl.$^6$ ............................ G06F 19/00; B23Q 3/157
[52] U.S. Cl. ..................... 364/474.11; 364/474.28; 364/474.36; 364/474.02; 364/474.29; 395/97; 82/118; 82/134; 483/56; 408/13
[58] Field of Search ........................... 29/27 C, 37 R; 82/118, 158, 129, 119, 120, 124, 110, 901, 1.11, 571; 364/474.02, 474.29, 474.3, 474.11, 474.34, 474.36; 483/18, 20, 24, 27, 56; 395/97

[56] References Cited

U.S. PATENT DOCUMENTS

| | | | |
|---|---|---|---|
| Re. 33,910 | 5/1992 | Compton | 82/18 |
| 3,726,162 | 4/1973 | Sato | 82/118 |
| 3,732,759 | 5/1973 | Fedorenko et al. | 82/19 |
| 3,878,742 | 4/1975 | Lahm | 82/1.11 |
| 3,895,559 | 7/1975 | Hoffman | 409/188 |
| 3,988,814 | 11/1976 | Hoffman | 29/27 A |
| 4,102,035 | 7/1978 | Voglrieder et al. | 483/56 |
| 4,137,802 | 2/1979 | Cox | 82/11 |
| 4,173,817 | 11/1979 | Voglrieder et al. | 483/14 |
| 4,196,501 | 4/1980 | Shimajiri et al. | 29/26 A |
| 4,324,161 | 4/1982 | Klancnik et al. | 82/120 |
| 4,370,080 | 1/1983 | Goode | 409/200 |
| 4,599,769 | 7/1986 | Latzko et al. | 29/26 A |
| 4,617,720 | 10/1986 | Palfery et al. | 483/31 |
| 4,646,422 | 3/1987 | McMurtry | 483/1 |
| 4,653,360 | 3/1987 | Compton | 82/18 |
| 4,704,773 | 11/1987 | Quinart | 29/27 C |
| 5,163,009 | 11/1992 | Yamane | 364/474.11 |
| 5,176,052 | 1/1993 | Mukai | 82/129 |
| 5,222,283 | 6/1993 | Laschet | 29/27 C |
| 5,239,901 | 8/1993 | Lin | 82/119 |
| 5,300,006 | 4/1994 | Tanaka et al. | 483/56 |
| 5,310,397 | 5/1994 | Kubota | 483/18 |
| 5,516,240 | 5/1996 | Gradel | 409/77 |
| 5,520,077 | 5/1996 | Lindstrom | 82/1.5 |
| 5,604,677 | 2/1997 | Brien | 364/474.28 |

*Primary Examiner*—Emanuel T. Voeltz
*Assistant Examiner*—Cuong H. Nguyen
*Attorney, Agent, or Firm*—Georges A. Maxwell

[57] ABSTRACT

A machine tool including an elongate bed with front and rear ends and a longitudinal axis, a spindle with a work piece-engaging chuck at the rear end of the bed, a first motor driving the spindle, a carriage at the front end of the bed, a first drive means with a second motor to position and move the carriage longitudinally of the longitudinal axis, an elongate cross-slide carried by the carriage and carrying a tool holder, a second drive means with a third motor to position and move the cross-slide on a lateral axis, an encoder connected with and reading the rotative position of the spindle, an electric-powered computerized primary controller connected with the encoder and with the first, second and third motors and controlling the operation thereof in response to machining programs stored therein; a rotary cutting tool head including an elongate rotary cutting tool holder driven by a fourth motor is mounted on the cross-slide remote from the cutting tool holder; a second electric-powered computerized controller is connected with the encoder, the primary controller and with the fourth motor and in which is stored a program which when processed thereby controls the direction of rotation, the rotative position and the ratio of rotation of the cutting tool holder relative to the rotation of the spindle in response to each signal in machining programs stored in the primary controller and received by the secondary controller and that directs the rotary cutting tool holder to be put into operation.

5 Claims, 5 Drawing Sheets

CNC MACHINE TOOL

BACKGROUND OF THE INVENTION

In the art of machine tools, single spindle lathes have long been used to manufacture cylindrical parts. A basic lathe of the character referred to above includes an elongate bed with front and rear ends and that defines a longitudinal axis through the lathe. Such a lathe next includes a head stock or bearing structure at the front end of the bed and in which an elongate motor-driven spindle, with front and rear ends, is rotatably carried on an axis that is parallel with the longitudinal axis of the lathe. A work piece engaging chuck is mounted on the rear end of the spindle and is disposed rearwardly. A carriage is mounted atop the rear end portion of the bed for movement longitudinally thereof. A first drive means is engaged with and between the bed and the carriage to selectively position and move the carriage longitudinally of the bed. A cross-slide is mounted atop the carriage for movement on a lateral axis that is normal to the longitudinal axis of the lathe. A second drive means is engaged with and between the carriage and the cross-slide to position and selectively move the cross-slide along the lateral axis. A tool holder is mounted atop the cross-slide and carries a cutting tool that is moved longitudinally of a piece of work engaged in the chuck by movement of the carriage on the longitudinal axis and that is moved radially into and out of engagement with the piece of work by movement of the cross-slide along the lateral axis. Upon rotating a piece of work engaged in the chuck and upon appropriate movement of the cutting tool into engagement with the piece of work by controlled movement of the carriage and cross-slide, machined parts of desired cylindrical cross-section can be turned or manufactured.

The most common drive means for moving the carriages and cross-slides of lathes are electric motor-driven screw mechanisms. Equivalent pneumatic and hydraulic drive means are sometimes employed.

In more recent years, lathes of the general character referred to above are provided with and controlled by electronic, computer-numerical-controllers that control each of the functions of the lathes and that are programmable to effect the automatic manufacture of multiplicities of different cylindrical parts that such lathes are intended and capable of producing. Computer-numerical-controlled lathes are commonly called CNC lathes.

In addition to the above, many CNC lathes of the general character referred to above are equipped with hollow spindles through which lengths of work stock can be fed; automatic chucks to releasably engage and hold the work stock; and, automatic feed means to intermittently feed stock through the spindles and into engagement with the chucks. With such means, parts can be continuously produced without having to repetitiously manually chuck individual work pieces or blanks, for the parts to be produced.

Due to the large and ever-increasing number of CNC lathes that are produced and sold, and, due to the keen competition in the marketplace, the cost of premium CNC lathes of the general character referred to above is approximately $50,000.

In the art of machine tools, there are those special machine tools called profilers. Profilers are used to manufacture irregular-shaped parts, such as splined and/or polygonal in cross-section shafts. Profilers, like single spindle lathes, include elongate beds with front and rear ends and that define the longitudinal axes of the machine tools; motor-driven spindles with work-engaging chucks at the rear end portions of the beds; carriages mounted on and movable longitudinally of the beds, forward of the spindles and chucks; and, cross-slides on the carriages and shiftable relative thereto on lateral axes that are normal to the longitudinal axes of the machine tools. In addition to the foregoing, and distinguishing profilers from lathes, profilers include rotary cutting tool heads mounted atop their cross-slides, rather than fixed or stationary tool holders such as are provided in ordinary lathes. The rotary cutting tool holders in profilers include motor-driven shafts that carry rotary cutting tool holders. The rotary cutting tool holders carry one or a multiplicity of circumferentially spaced cutting tools. Profilers further include special computer-numerical-controllers that control the direction of rotation and the ratio of rotation of the motor-driven shafts and cutting tools of their cutting tool heads relative to the rotation of their spindles, chucks and work pieces.

A profiler of the character referred to above with a cutting tool holder having a single cutting tool can, for example, machine a cylindrical in cross-section work piece into a square in cross-section part by rotating the cutting tool of the rotary cutting tool head relative to the spindle and the work carried thereby at a ratio of 4-to-1. At a turning ratio of 4-to-1, the cutting tool engages side portions of the cylindrical work piece every 45° about its circumference. By progressively advancing the rotating tool longitudinally and radially inwardly relative to the work piece, the work piece is first formed with four circumferentially spaced flats about its perimeter and is ultimately machined into a square in cross-section part. Exercising similar procedures, parts with many different polygonal cross-sections can be manufactured. By changing the turning axis of the cutting tool 90° and exercising similar procedures, parts with various forms of circumferentially spaced longitudinally extending grooves, flats and the like can be manufactured.

Most present day profilers are CNC machine tools and are such that the ratio of rotation of the rotary cutting tool holders relative to the work-carrying spindles; the direction of rotation of the rotary cutting tool holders and the spindles; the rate of rotation of the spindles; the rotative position of the rotary cutting tool holders relative to the rotative position of the spindles; the positions of the carriages and cross-slides on the longitudinal and lateral axes of the machine tools; and, the direction and the speed at which the carriages and cross-slides move relative to rotation of the spindles, are accurately controlled in accordance with numerical programs that are entered into or stored within the memories of the controllers; for the production of particular machined parts.

Present day CNC profilers are highly specialized machine tools that utilize costly step motors to drive their spindles, rotary cutting tool holders and their carriage and cross-slide drive means. In addition to the foregoing, the placement, arrangement and relative angular dispositioning of the spindles, carriages, cross-slides and rotary cutting tool holders in many profilers is unique and such that the machined tools are capable of being adjusted, set up and operated to perform many seldom-used and/or unusual profiling operations that must be utilized to manufacture certain out-of-the-usual or exotic parts. In the great majority of cases, CNC profilers are never or are rarely used to perform those seldom used and unusual functions they are capable of performing. Accordingly, with possible rare exception, present day profiling machine tools are machined tools that afford a great number of capabilities that the majority of users of such machine tools will ever utilize and thereby exceed the needs and requirements of the great majority of those who purchase and use them.

As a result of the differences that exist between CNC lathes and CNC profilers, the latter are not practically suited for producing turned parts such as are commonly produced with lathes.

Present day or state-of-the-art CNC profilers of the general character referred to above are highly specialized machine tools that are produced in notably fewer numbers than are CNC lathes and, at this time, cost approximately $400,000.

Due to the design and the manner in which most CNC profilers function, they are unsuitable for producing those parts that are normally produced on CNC lathes. While it is possible to use a CNC profiler to machine a cylindrical part, such as might be produced on a lathe, the amount of work the profiler must perform and the time it would take to produce such a part is likely to be notably greater than the amount of work and the time it would take a lathe to produce that part. Accordingly, CNC profilers are not practical, effective and/or efficient for performing lathe work. More important, it is uneconomical and poor practice to utilize a $400,000 CNC profiler to produce parts or do that work that can be more effectively and efficiently produced on a $50,000 CNC lathe.

In the course of manufacturing profiled parts in CNC profilers, it is common practice to produce cylindrical blank work pieces in CNC lathes and to transfer those blank work pieces from the lathes to the profilers. This practice is dictated by the fact that it is not economically practical nor is it good practice to use a $400,000 CNC profiler to repeatedly perform initial machining operations on parts that can be more rapidly and more economically performed by a $50,000 CNC lathe. It is better practice and more economical for the owner and user of a $400,000 CNC profiler to own and use a $50,000 CNC lathe to produce blank work pieces, to be subsequently fed into the CNC profilers. This is true in spite of the fact that the blank work pieces produced in the lathe must be handled and transported from the lathe to the profiler and chucked therein, one at a time; and, in spite of the fact that the lathe might be let to stand idle while the parts are being worked upon by the profiler.

As a result of the foregoing, it is apparent that there exists a need for a CNC machine tool that can easily and economically perform the functions of both a CNC lathe and a CNC profiler and such so that the turning (lathe work) and profiling of work to be performed on a piece of work can be performed sequentially and/or concurrently in a single machine tool.

There is also a great and present need for a machine tool capable of effectively and efficiently functioning as both a lathe and a profiler that can be produced and profitably sold for a small fraction of the combined costs for a CNC lathe and a CNC profiler.

OBJECTS AND FEATURES OF THE INVENTION

It is an object of the present invention to provide a novel CNC machine tool that effectively and efficiently functions as a lathe and as a profiler.

It is another object and a feature of the invention to provide a CNC machine tool of the character referred to above that includes a prior art CNC lathe, including a motor-driven spindle; motor-driven carriage; motor-driven cross-slide; an encoder connected with the spindle, a computer-numerical-primary controller connected with the encoder and the motors to control operations of the motors in accordance with numerical programs stored in the primary controller; and, a novel, easy and economical to make rotary cutting tool head with a motor-driven rotary cutting tool holder mounted on the cross-slide of the lathe and an inexpensive secondary computer-numerical-controller with a manually operable programming terminal and connected with and between the encoder, primary controller and the motor of the rotary cutting tool head and functioning to control the ratio of rotation of the rotary cutting tool holder relative to the spindle when the rotary cutting tool head is put into operation in response to discrete numerical command signals of programs stored in the primary controller and that direct that the rotary cutting tool head be put into operation to perform profiling operations on work pieces carried by the rotating spindle.

It is an object and a feature of the present invention to provide a new machine tool of the general character referred to above that can be profitably made and sold for about $150,000 and that is capable of effectively and efficiently performing the functions of and doing the work of both a CNC lathe and a CNC profiler, the combined costs of which would be in excess of $400,000.

The foregoing and other objects and features of my invention will be apparent and will be fully understood from the following detailed description of typical preferred forms and applications of the invention throughout which description references made to the accompanying drawings.

DETAILED DESCRIPTION OF THE INVENTION

Figure 1:
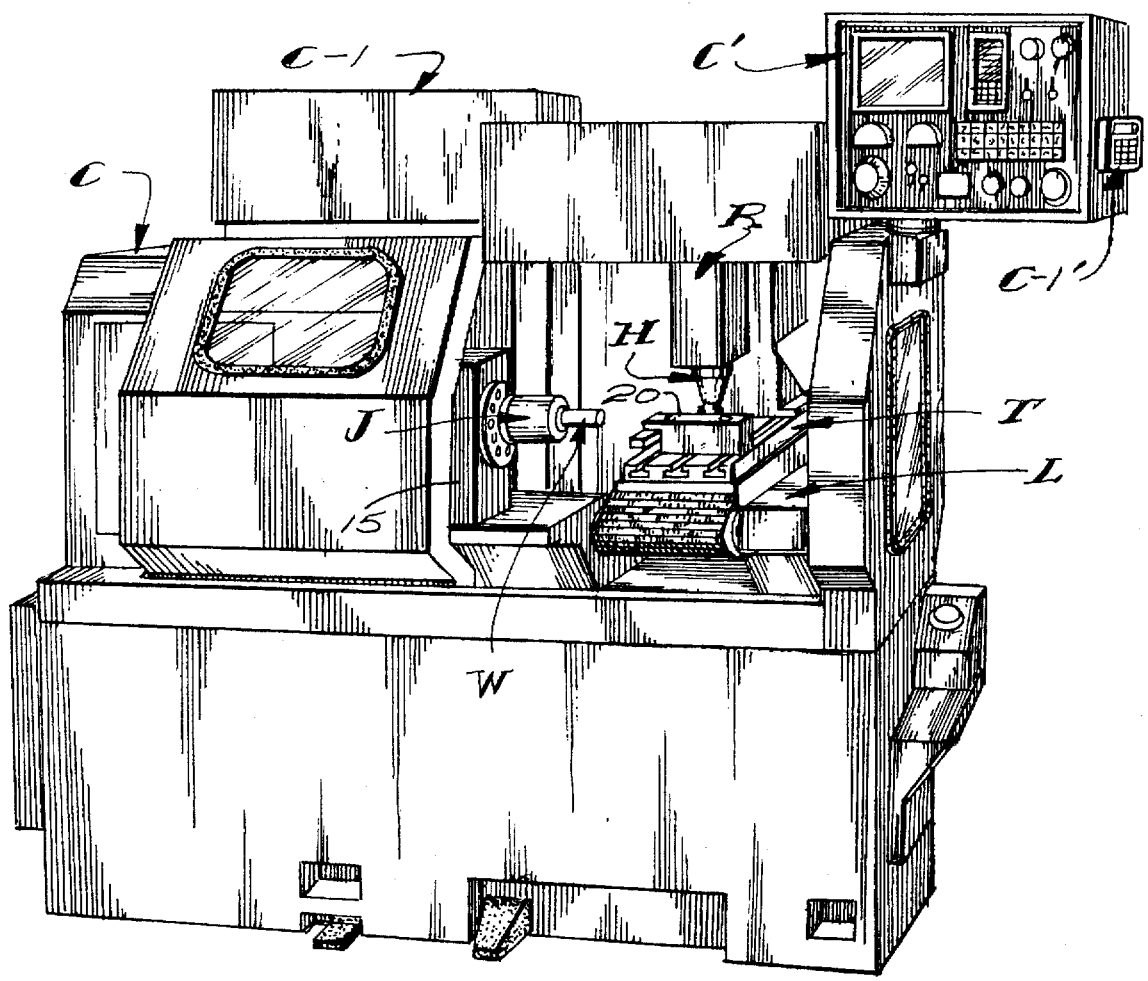
FIG. 1 is a perspective view of a machine tool embodying the invention.

In FIG. 1 of the drawings, I have illustrated a prior art CNC lathe that has been modified to embody my invention. For this purpose, I have elected to illustrate a Faunuc, model OTC lathe. This lathe has a 13.8" swing-over bed, a 6" chuck, an ASA A2-5 spindle nose, a 5.8" diameter spindle bore, a spindle speed of 35 to 40,000 rpm, a maximum longitudinal X-axis of 16" with a rapid traverse of 315" per minute, a maximum lateral Z-axis of 11" with a rapid traverse of 3.5" per minute, and a table or cross-slide width of 8.5". The spindle drive includes a 5.5 KW motor. The drive for the X and Y axes are screw drives and include 8 HP and 1.2 HP motors, respectively. The lathe has a solid aged cast iron base, weighs approximately 5,000 lbs. and occupies about 71"×67" of floor space. The computer-numerical-controller is a programmable primary controller. The primary controller is connected with an encoder related to the spindle and with the several motors of the lathe and is such that it affords complete control of the rotative position, the direction and the speed at which the spindle is turned and the position, direction, distance and speed at which the parts related to the X and Y axes move relative to rotation of the spindle and a work piece carried thereby. The primary controller is capable of affording programmed control of an automatic chuck and an automatic stock feed; and, has sufficient capacity to receive and hold programs that include commands for and effect the performance of other functions associated with the operation of such a lathe.

But for the minor differences in details of design and construction, the Faunuc CNC lathe illustrated and described above is not so distinct from or unlike many commercially available CNC lathes produced by other machine tool manufacturers that can be effectively utilized in putting my invention into practice.

Figure 2:
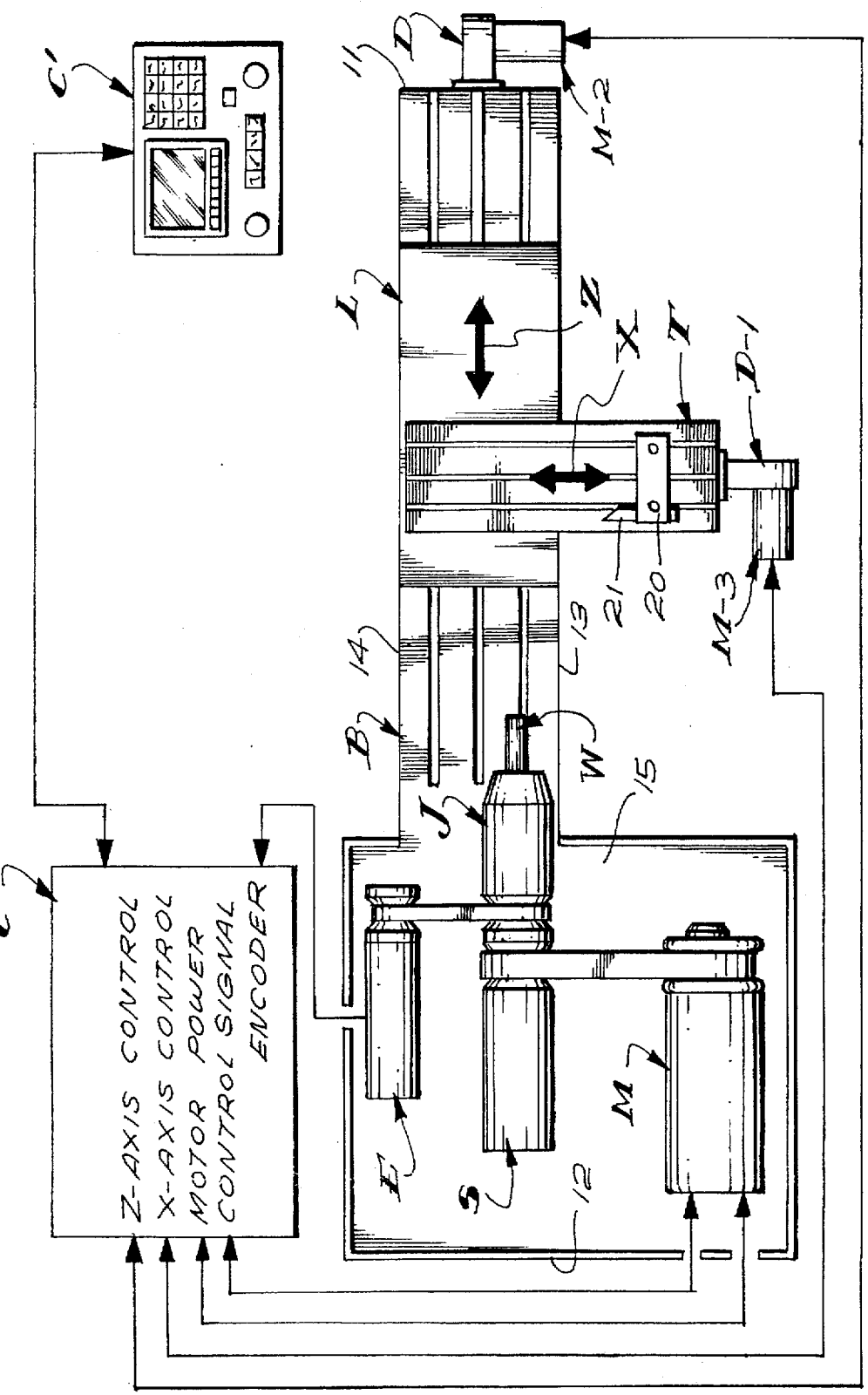
FIG. 2 is a diagrammatic view of a prior art lathe embodied in my new machine tool.

FIG. 2 is a diagrammatic view of the above-noted prior art CNC lathe. The lathe, as diagrammatically illustrated, includes an elongate horizontal frame or bed B with forward and rear ends 11 and 12 and front and back sides 13 and 14. The bed defines the longitudinal axis Z of the lathe. A head stock structure 15 occurs at and projects up from the rear end portion of the bed. An elongate spindle S is bearing supported within the head stock section. The spindle S is spaced above the bed on a horizontal axis that is parallel with the axis Z and has a forward end portion projecting forwardly from within the head stock structure. A work piece engaging chuck C is carried by the front end of the spindle S. A piece of work W is shown engaged in the chuck. A first primary electric motor M is mounted at the head stock structure and is suitably drivingly connected with the spindle S.

An elongate carriage L is supported and guided atop the front end portion of the bed for reciprocal movement longitudinally of the axis X. A motor-driven first drive means D is engaged with and between the carriage and the bed to position and to move the carriage on axis Z. The means D is preferably a screw means and includes a second motor M-2.

An elongate laterally extending cross-slide T is supported on and guided by the carriage L for reciprocal movement on a horizontal laterally extending axis X that is normal to the axis Z. A second drive means D-1 is provided to position and to move the cross-slide longitudinally of the axis X and, like the first drive means D, is preferably a screw drive means and includes a third motor M-3. The cross-slide occurs on a horizontal plane spaced below the turning axis of the spindle S and of the work piece W carried thereby.

Mounted atop the cross-slide T at the front end portion thereof, is an upwardly projecting tool holder 20 that is shown as carrying a cutting tool 21. As shown, the holder 20 and tool 21 normally occur forward of the chuck C and the work piece W and are spaced in front of the vertical longitudinal plane of the machine tool that extends through the turning axis of the chuck and work piece.

In addition to the foregoing, the lathe includes an electronic, primary computer-numerical-controller C that includes a remote terminal C'. The terminal C' is connected with the controller by a suitable conductor cable. The terminal C' is manually operable to enter the numerical data for programs for the production of different machined parts into a memory within the primary controller. The primary controller is connected with and receives the output signal from an encoder E that is connected with a reads the direction, the rotative position and therefore the rate of rotation of the spindle S. In response to discrete numerical signals of the programs that are stored in the memory of the primary controller, the primary controller operates to control the rotation position, direction of rotation and the rate of rotation of the spindle by accurate control of the motor M, which is connected with the primary controller to receive power therefrom and to direct a control signal thereto.

In addition to the foregoing, the primary controller controls the positions of the carriage L and cross-slide T on their axes Z and X and controls the direction and the rate at which the carriage and cross-slide move relative to the spindle and work piece, by controlling the motors M-2 and M-3 which, like the motor M, are connected with and receive power from the primary controller.

In addition the foregoing, the primary controller C can control other functions of the lathe, in accordance with common practices and as circumstances might require.

Figure 3:
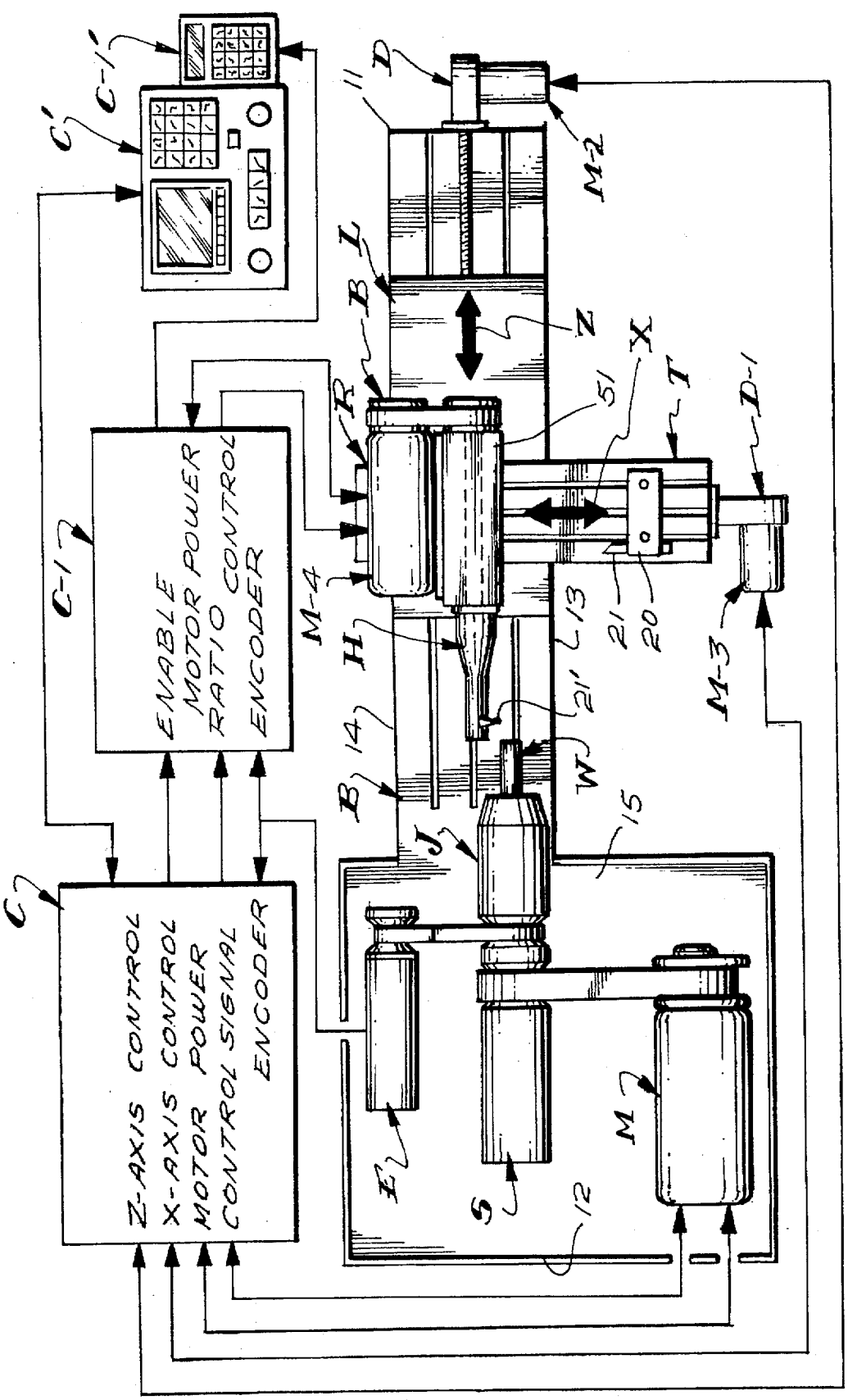
FIG. 3 is a diagrammatic view of the new machine tool.

FIG. 3 is a diagrammatic view of the machine tool of the present invention. The machine tool, as diagrammatically shown, includes all of the elements and parts of the lathe diagrammatically illustrated in FIG. 2 of the drawings and which are identified by like reference characters and numerals.

In addition to the parts going to make up the CNC lathe, the machine tool of the present invention includes a rotary cutting tool head R mounted atop the cross-slide T in sufficient spaced relationship from the tool holder H and cutting tool 21 to freely accommodate the chuck C and work piece W therebetween. As shown, the rotary tool cutting head R is at the back or rear end of the cross-slide T and occurs in spaced relationship from the back side of the longitudinal vertical plane that extends through the turning axis of the spindle S and work piece W. With this relationship of parts, upon movement of the cross-slide T on axis X and longitudinal movement of the carriage L on the axis Z, the cutting tool 21 carried by the tool holder H and a cutting tool 21' carried by a rotary cutting tool holder H of the head R can be selectively moved into and out of working relationship with the rotating work piece W carried by the chuck C, to perform turning or profiling operations, as desired and or as circumstances require.

Figure 4:
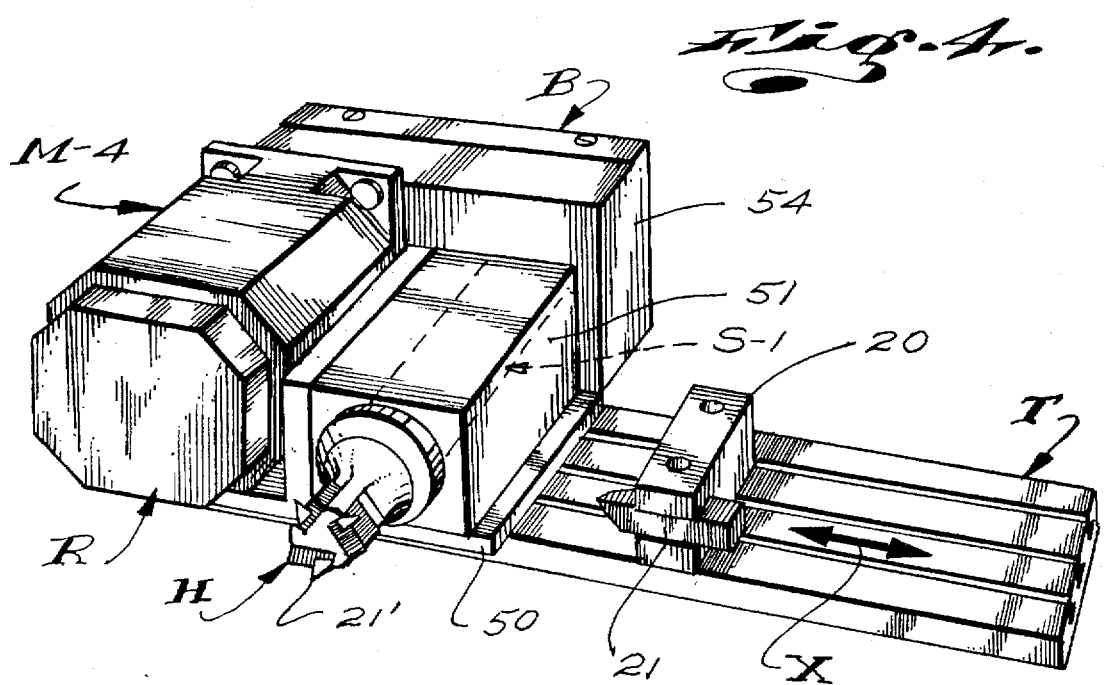
FIG. 4 is a perspective view of one form of rotary cutting tool head.

Referring to FIG. 4 of the drawings, the rotatable cutting tool head R includes an elongate spindle or shaft S-1 that extends through and is bearing supported within a shaft housing 51 and that occurs on an axis that is normal to the axis X and parallel with the axis Z.

The shaft S-1 is driven by an electric motor M-4 through a suitable gear or belt drive means B.

It is to be noted that if the motor M-4 of the head R was to be driven independent of the rotation of the spindle S and the work piece W, the motors M and M-4 could be connected directly with the primary controller C, to be controlled thereby, independent of rotation of the spindle and/or the work piece. However, to enable the machine tool to perform profiling operations, the ratio of rotation of the shaft S-1, driven by the motor M-4, and the spindle S, driven by the motor M, must be capable of being varied and accurately controlled. Further, the rotative position of the shaft S-1 relative to the rotative position of the spindle S and the work piece W carried thereby, must be controllable and such that the rotative positions of the shaft S-1 and the spindle S can be adjusted and synchronized, as circumstances require.

In accordance with the foregoing and in furtherance of my invention, I provide a secondary computer-numerical-controller C-1 with a related programming terminal C-1'. The secondary controller C-1 is provided to adjust and control the ratio of rotation of the shaft S-1 and to the rotation of the spindle S, control the rotative position of the shaft S-1 relative to the rotative position of the spindle S and to vary and synchronize rotation of the shaft and spindle, as required.

The secondary controller C-1 is connected with the motor M-4 to deliver power thereto and to receive a control signal therefrom. The secondary controller C-1 is connected to and receives the output signal from the encoder E and is connected with the primary controller C to receive discrete enabling or command signals therefrom and to store those signals in its memory. Each of the discrete command signals received from the primary controller and stored in the memory of the secondary controller is a numerical or digital command of a machining program stored in the primary controller that directs the rotary cutting head R to be put into operation. Whenever that discrete command signal is again transmitted from the primary controller into the secondary controller, the secondary controller processes the incoming signal and operates to energize the motor M-4 and put the head R into operation.

The programming terminal C-1' is operated to put into the memory of the secondary controller C-1, in association with each discrete command signal received from the primary controller C and stored therein, data or signals for controlling that ratio of rotation of the motor M-4 and the shaft S-1 relative to the spindle S that is to be maintained when the controllers put the head R into operation to perform a programmed machining operation.

With rare exception, the discrete command signals received from the primary controller and stored in the secondary controller are commands within particular, numbered or otherwise identified machining programs stored in the primary controller and are identified in the secondary controller by the same identifying numbers or indicator. As each discrete command signal of each machine programmed machining program in the primary controller is received by the secondary controller, the reception thereof is displayed at the terminal C-1'. At that time, the operator of the machine tool, through use of the terminal C-1', enters and/or adds to the stored data for that signal that data which, when processed, in the secondary controller causes the shaft S-1 to rotate at a predetermined ratio relative to the spindle S. Thereafter, when a discrete signal for operation of the head R is transmitted from the primary controller to the secondary controller and the secondary controller operates to set the head R into operation, the head R operates to rotate the shaft S-1 in programmed ratio to the spindle.

In addition to controlling the ratio of rotation of the shaft S-1 relative to the spindle S, the secondary controller also controls the direction of rotation of the shaft S-1 and the rotational position of the shaft S-1 relative to the rotative position of the spindle S. In this regard, the encoder E, as previously noted, in addition to reading the number of turns and the rate of rotation of the spindle S, also reads the rotative position of the spindle S from, for example, top dead center through each fraction of a degree of each rotation thereof. It therefore reads the rotative position of the piece of work W carried by the spindle. If, for example, the piece of work is to be machined or profiled with a first pair of flats at diagrammatically opposite sides thereof and with a second pair of flats spaced axially from the first pair of flats and circumferentially offset 90° therefrom, it is necessary that the rotative position of the spindle S and work piece W and the rotative position of the shaft S-1 and the cutting tool carried thereby be accurately controlled and synchronized so that the cutting tool can be made to work to remove material from the work piece at those predetermined positions or locations about the outer perimeter portions thereof that must be removed to establish the desired part or product. To this end, when the operator of the machine tool enters the ratio of rotation that is to be maintained between the shaft S-1 and spindle S, in association with each discrete command signal for operation of the head R, he also enters the rotative position of the shaft S-1 that must be established and maintained to effect machining of the work piece at the prescribed location(s) about its circumference. In practice, the reference point of rotation for the spindle S is top dead center and the operator of the machine tool need only enter into the appropriate program stored in the secondary controller the degree from top dead center or the spindle S the shaft S-1 must be for the cutting tool driven by the shaft S-1 of the head R to assure that the cutting tool will work upon the work piece W at that position about its exterior where material must be removed to produce the desired product. In the example given above, if one of the flats of the first pair of flats is to be at top dead center of the piece of work (and the spindle), the operator of the machine enters 0° in the stored data that directs machining of the first pair of flats and enters 90° in the stored data that directs machining of the second pair of flats.

It will be apparent from the above that the functions of the secondary controller C-1 are limited to the handling and use of data for those discrete command signals received from the primary controller to put the head R into operation and that limited additional data which, when processed, controls the relative rotative position of the shaft S-1 relative to the spindle and the ratio of rotation of the shaft S-1 relative to the spindle. It will be apparent from the foregoing that the functional requirements of the secondary controller C-1 are so few and are so simple that the controller C-1 can be a rather simple, small and inexpensive unit. There are several manufacturers of computer-numerical machine tool controllers that produce and sell a wide range of controllers that vary widely in size, complexity and cost. I have determined that for the purpose of putting my invention into practice any one of several of the smaller, least complicated and least costly commercially available controllers can be advantageously used to put my invention into practice.

In FIG. 4 of the drawings, I have shown a first form of rotary cutting tool head R mounted atop the rear end portion of an elongate cross-slide T, in appropriate rearward spaced relationship from a tool holder 20. The head R is that head R that is diagrammatically shown in FIG. 3 of the drawings. The head R includes a mounting part 50 in the form of a flat plate, that is suitably fastened to the cross-slide. An elongate horizontal bearing housing 51 is carried by the part 50 to extend transverse the longitudinal axis X of the cross-slide. A elongate horizontal cutting tool shaft S-1 extends through and is suitably bearing supported within the housing. An elongate cutting tool holder H is mounted on and projects axially from a forward end of the shaft. An elongate Servo motor M-4 is mounted on the part 50, at one side of the housing, and is drivingly connected or coupled with the shaft by a suitable drive means B. The drive means B is preferably a belt drive means and includes case 54 within which the transmission parts are housed and that extends between the housing 51 and the motor M-4, as shown. The cutting tool holder H is of sufficient axial extent to project from a side of the slide T to occur in lateral spaced parallel relationship with a piece of work W carried by the chuck C on the spindle S of a related machine tool structure and is moveable axially thereof so that a cutting tool 21' carried by the holder can be moved relative to the work piece without interference with other parts and/or portions of the head R and/or the cross-slide T.

The above-noted rotary cutting tool head R, with a horizontally disposed shaft S-1 and tool holder H is particularly suited for manufacturing polygonal parts such as square, hexagonal or octagonal in cross-section parts and parts with face lugs, slots and the like.

Figure 5:
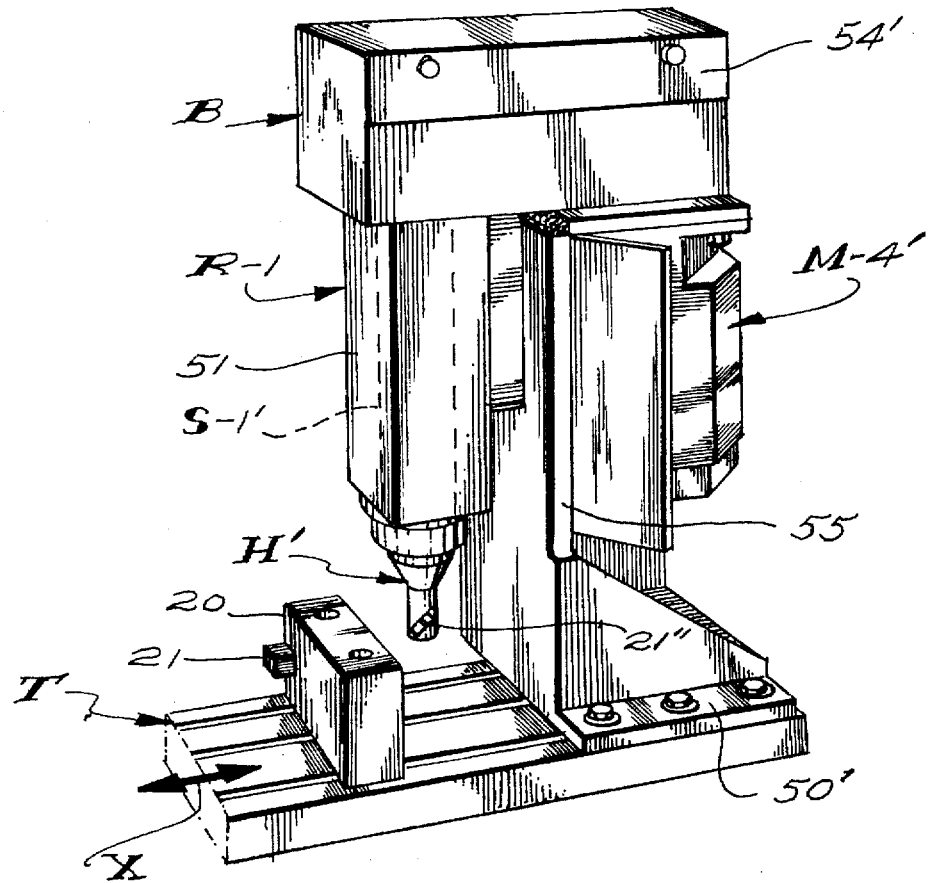
FIG. 5 is a perspective view of a second form of rotary cutting tool head.

In FIG. 5 of the drawings, I have shown another or second form of rotary cutting tool head R-1 mounted atop the rear end portion of a cross-slide T, in suitable spaced relationship from a tool holder 20. The head R-1 includes a mounting part 50' that is suitably fastened to the cross-slide T. The mounting part 50 next includes an upwardly projecting laterally extending plate 55 with front and rear surfaces. An elongate vertically extending bearing housing 51' is mounted on the front surface of the plate 55 and rotatably carries a cutting tool shaft S-1'. An elongate vertically extending motor M-4' is mounted on the back surface of the plate 55. The motor M-4' is drivingly connected with the shaft S-1' by a suitable (gear or belt) drive means B within a case 54' that extends between the upper ends of the housing 51' and the motor M-4'. A elongate cutting tool holder H' is carried by and depends from the lower end of the shaft S-1' and from lower end of the housing 51'. The rotary cutting tool holder H' is suitably spaced from the front of the plate 55 and above the cross-slide T, substantially as shown. In accordance with common practices, at least one cutting tool 21" is mounted on the lower end of the tool holder to occur in suitable vertical spaced relationship above the cross-slide T and below the remainder of the head structure R'.

This second form of head R-1 having a vertical shaft, is particularly suited for manufacturing splined parts, gears, ratchets, Phillips and Torx bits, screwdrivers and the like.

The above-noted heads H and H' are interchangeable and each is utilized when the machine tool is to be dedicated to the manufacture of parts that head is best suited to manufacture.

Figure 6:
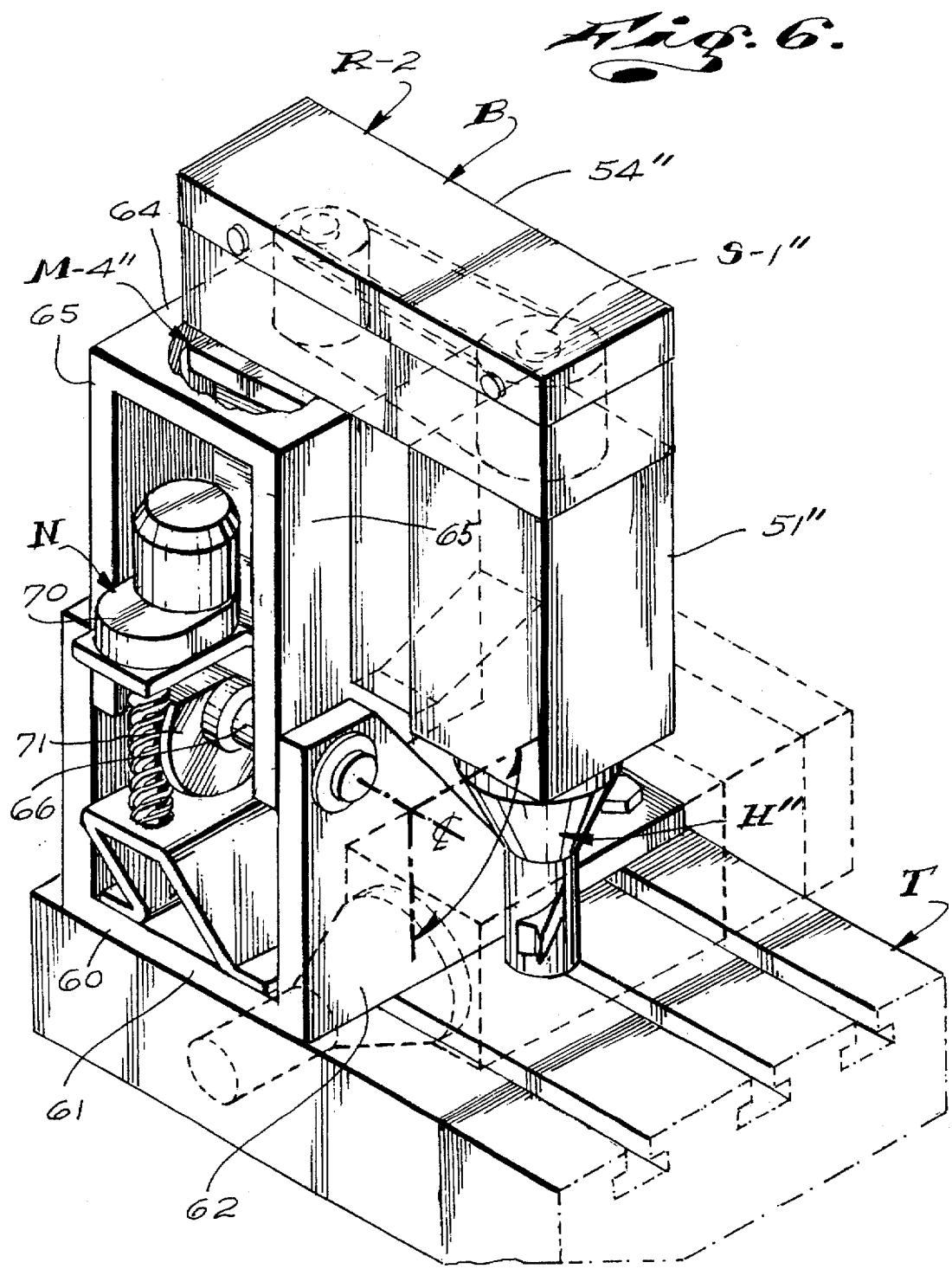
FIG. 6 is an isometric view of a third form of cutting tool head.

In FIG. 6 of the drawings, I have shown a third form of rotary cutting tool head R-2. The mounting head R-2 is mounted atop the rear end portion of an elongate cross-slide T. The head R-2 includes an upwardly and laterally opening U-shaped lower, outside, first mounting part 60 with a flat base 61 that is mounted atop the cross-slide T and that has spaced apart upwardly projecting apertured outside plates 62. The head R-2 next includes a downwardly and laterally opening U-shaped, inside or second mounting part 63 with a flat upper base 64 and spaced apart inside plates 65 the depend from the base 64. The part 63 is positioned within the part 60, as shown. The inside plates 65 of the part 63 are pivotally connected with the outside plates 62 of the part 60 by an elongate transversely extending shaft 66, as shown. The part 63 is pivotally moveable relative to the part 60 between first and second positions. In the first position, the base 64 of the part 63 is horizontally disposed, as shown in solid lines in FIG. 6 of the drawings. In the second position, the base 64 of the part 63 is vertically disposed, as shown in dotted lines in FIG. 6 of the drawings.

As shown, an elongate vertically extending bearing housing 51" is mounted on one of the inside plates 65 of the part 63, at a portion of the forwardly disposed or outside surface thereof that project out from with the part 60. An elongate vertical cutting tool shaft S-1" extends through and is rotatably carried by the housing 51". An elongate cutting tool holder H" is mounted on and projects downwardly from the lower end of the shaft and the housing 51". An elongate motor M-4" is mounted within the part 63 in lateral spaced, parallel relationship with the housing 51" and shaft S-1". The motor M-4" and the shaft S-1" are drivingly connected with each other by a gear or belt drive means B" within a drive case 54" that extends between the upper ends of the housing 51" and the motor M-4".

The head R-2 next includes suitable motor-drive positioning means N' for selectively moving the part 63 to and from its first and second positions. For the purpose of this disclosure, the means N includes a motor-driven worm gear unit 70 mounted within the part 60 and engaging a quadrant gear 71 on the shaft 66, substantially as shown in the drawings.

In addition to the basic combination and relationship of parts set forth above, the head H-2 can include structure and/or parts that serve to reinforce the structure and to guide and maintain the various parts thereof in proper position when the parts are in their first and second positions.

It will be apparent that with the head R-2 the cutting tool holder H is selectively shiftable between a vertical position, as shown in solid lines in the drawings, and a horizontal position as shown in dotted lines in the drawings, and is therefore suitable for effectively performing those functions that the head R shown in FIG. 4 of the drawings and the head R-1 shown in FIG. 5 of the drawings are provided to perform.

It will also be apparent that the drive means N of the head R-2 is such that it can be controlled by the primary and secondary controllers C and C' of a related machine tool, in accordance with programs stored in the controllers to move the parts of the head R-2 to and from their first and second positions.

Having described typical preferred forms and applications of my invention, I do not wish to be limited to the specific details herein set forth but wish to reserve to myself any modifications and/or variations that might appear to those skilled in the art and that fall within the scope of the following claims.

Having described my invention, I claim:

1. In combination; a computer-controlled lathe including an elongate bed with front and rear ends, front and rear sides, and defining a longitudinal axis, an elongate spindle with front and rear ends rotatably supported at the rear end portion of the bed, a work piece-engaging chuck at the front end of the spindle, a first motor drivingly connected with the spindle, and encoder connected with the spindle and reading the rotative position thereof, an elongate carriage carried by the front end portion of the bed, a first drive means including a second motor operating to position and move the carriage longitudinally of the longitudinal axis, an elongate cross-slide carried by the carriage and on a lateral axis that is normal to the longitudinal axis, a tool holder with a cutting tool on the cross-slide, a second drive means including a third motor operating to position and move the cross-slide longitudinally of the lateral axis, a primary computer-numerical-controller connected with the encoder and with the first, second and third motors and operating to power and control the direction and rate of rotation of the first motor and to control the direction and rate of rotation of the second and third motors, a primary programming terminal connected with the primary controller and operating to enter and store in the memory of the primary controller machining numerical data programs for the machining of parts and that cause the primary controller to generate and process command signals that effect programmed operation of the first, second and third motors; and, a rotary cutting tool head carried by the cross-slide in spaced relationship from the tool holder and including a rotary cutting tool holder with at least one cutting tool and drivingly rotated by a fourth motor; an electric-powered secondary computer-numerical-controller connected with the encoder and primary controller and the fourth motor and controlling operation of the fourth motor to control the rotative position and the rotation of the fourth motor and rotary tool holder relative to the spindle in response to programs stored in the secondary controller that include discrete command signals for operation of the rotary cutting tool head in machining programs stored in the primary controller; and, a manually operable secondary programming terminal connected with the secondary controller and operating to enter into each machining program stored in the secondary controller data which when processed by the secondary controller controls the direction of rotation and the rotative position and rate of rotation of the fourth motor and rotary tool holder relative to the spindle.

2. The combination set forth in claim 1 wherein the rotary cutting tool head includes a mounting part fastened to the cross-slide and carrying the fourth motor, an elongate bearing housing carried by the mounting part, an elongate cutting tool shaft rotatably supported within the bearing housing and carrying the rotary cutting tool holder; and, a drive means drivingly connecting the fourth motor and the cutting tool shaft.

3. The combination set forth in claim 2 wherein the mounting part is an elongate plate with longitudinally spaced and oppositely disposed front and rear edges, laterally spaced and oppositely disposed front and rear side edges, a cross-slide engaging bottom surface and a top surface, the elongate bearing housing is disposed horizontally and is mounted on the top surface of the mounting part with its longitudinal axis extending laterally thereof, the cutting shaft extends longitudinally through the bearing housing and has one end projecting from one end thereof, the rotary cutting tool holder is an elongate part connected with and projects axially from said one end of the cutting tool shaft.

4. The combination set forth in claim 2 wherein the mounting part includes a flat, elongate horizontal base plate with longitudinally spaced oppositely disposed front and rear ends, laterally spaced oppositely disposed front and rear side edges, a top surface and a cross-slide engaging bottom surface, an elongate mounting plate with front and rear surfaces projecting upwardly from the front end portion of the base plate, the fourth motor is mounted on the rear surface of the mounting plate, the elongate bearing housing is vertically disposed and is mounted on the front surface of the mounting plate to project forwardly beyond the front side of the base plate with its lower end spaced above the horizontal plane on which the base plate occurs, the cutting tool shaft has a lower end at the lower end of the bearing housing, the rotary cutting tool holder is an elongate part connected with the lower end of the cutting tool shaft and depends therefrom.

5. The combination set forth in claim 2 wherein the mounting part includes a cross-slide engaging base with at least one upwardly projecting support plate, a horizontal pivot shaft is rotatably carried by the support plate, an elongate carrier part is fixed to the pivot shaft and projects radially therefrom, the fourth motor is mounted on the carrier part, the elongate bearing housing is mounted on the carrier part with its axis parallel with the longitudinal axis of that part and spaced radially from the axis of the pivot shaft, a motor-driven positioning means is connected with the mounting part and the pivot shaft and operates to selectively rotate the pivot shaft and pivot the carrier part between a first position where the longitudinal axis of the bearing housing is on a predetermined horizontal plane that is spaced below the axis of the pivot shaft and a second position where the longitudinal axis of the bearing housing is vertical and is spaced laterally from the axis of the pivot shaft, the cutting tool shaft is rotatably supported in the bearing housing, the cutting tool holder is an elongate part in axial alignment with and connected with one end of the cutting tool shaft, the cutting tool part projects downwardly from the bearing housing and intersects said predetermined horizontal plane when the bearing housing is in its vertical second position and projects horizontally and laterally from the cutting tool head on said predetermined horizontal plane when the bearing housing is in its horizontal position.

* * * * *